(12) United States Patent
Mongia et al.

(10) Patent No.: US 7,602,607 B2
(45) Date of Patent: Oct. 13, 2009

(54) EXTERNAL PROTRUSION FOR AIR FLOW DISTRIBUTION

(75) Inventors: Rajiv K. Mongia, Fremont, CA (US); Bijendra Singh, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 11/864,751

(22) Filed: Sep. 28, 2007

(65) Prior Publication Data

US 2009/0086423 A1 Apr. 2, 2009

(51) Int. Cl.
*H05K 7/20* (2006.01)
(52) U.S. Cl. ............. 361/695; 361/679.48; 361/679.49; 361/690; 174/16.1; 165/104.33
(58) Field of Classification Search ........................ None
See application file for complete search history.

(56) References Cited

U.S. PATENT DOCUMENTS

| 5,751,550 | A * | 5/1998 | Korinsky ..................... 361/695 |
| 6,239,971 | B1 * | 5/2001 | Yu et al. ..................... 361/695 |
| 6,504,719 | B2 * | 1/2003 | Konstad et al. ............. 361/698 |
| 7,310,227 | B2 * | 12/2007 | Kusamoto et al. ........... 361/695 |
| 7,384,155 | B2 * | 6/2008 | Seki ............................ 353/60 |

* cited by examiner

*Primary Examiner*—Boris L Chervinsky
(74) *Attorney, Agent, or Firm*—Kacvinsky LLC

(57) ABSTRACT

An apparatus with some embodiments is described having a protrusion to provide air flow distribution to a computing device. In some embodiments, the apparatus may include a housing with one or more openings on each of the external surfaces of the housing, an air mover, and a protrusion to channel airflow to an inlet while restricting airflow from an outlet from being circulated back into the inlet. Furthermore, in some embodiments, the apparatus may be implemented on a computer system that includes one or more electronic components can generate thermal energy. Other embodiments are described.

18 Claims, 4 Drawing Sheets

EXTERNAL PROTRUSION FOR AIR FLOW DISTRIBUTION

FIELD OF THE INVENTION

This invention relates to embodiments of protrusion distribute airflow. More specifically, it relates to embodiments where the protrusion is external to the computer system.

BACKGROUND OF THE INVENTION

Computer system designs often provide increased functionality in a small form factor. This poses thermal design challenges as the increased functionality is usually provided by electronic components which generate thermal energy, or heat. In some designs, thermal issues are often addressed by locating heat generating thermal components near openings in the housing of the computer system. Often, this is not enough, and air movers, such as fans, are included in the housing.

The air movers are used to increase the circulation of air through the computer system. As the air moves through the computer system, it comes into thermal contact with the heat generating components and passes out of the housing as heated exhaust. In many housing designs, the exhaust air can circulate back into the housing, reducing the possible heat transfer rate of the system. As can be appreciated, there remains a need for systems that reduce the recirculation of exhaust air.

BRIEF DESCRIPTION OF THE DRAWINGS

Embodiments of the invention are described with reference to the accompanying drawings wherein.

DETAILED DESCRIPTION OF THE INVENTION

Figure 1:
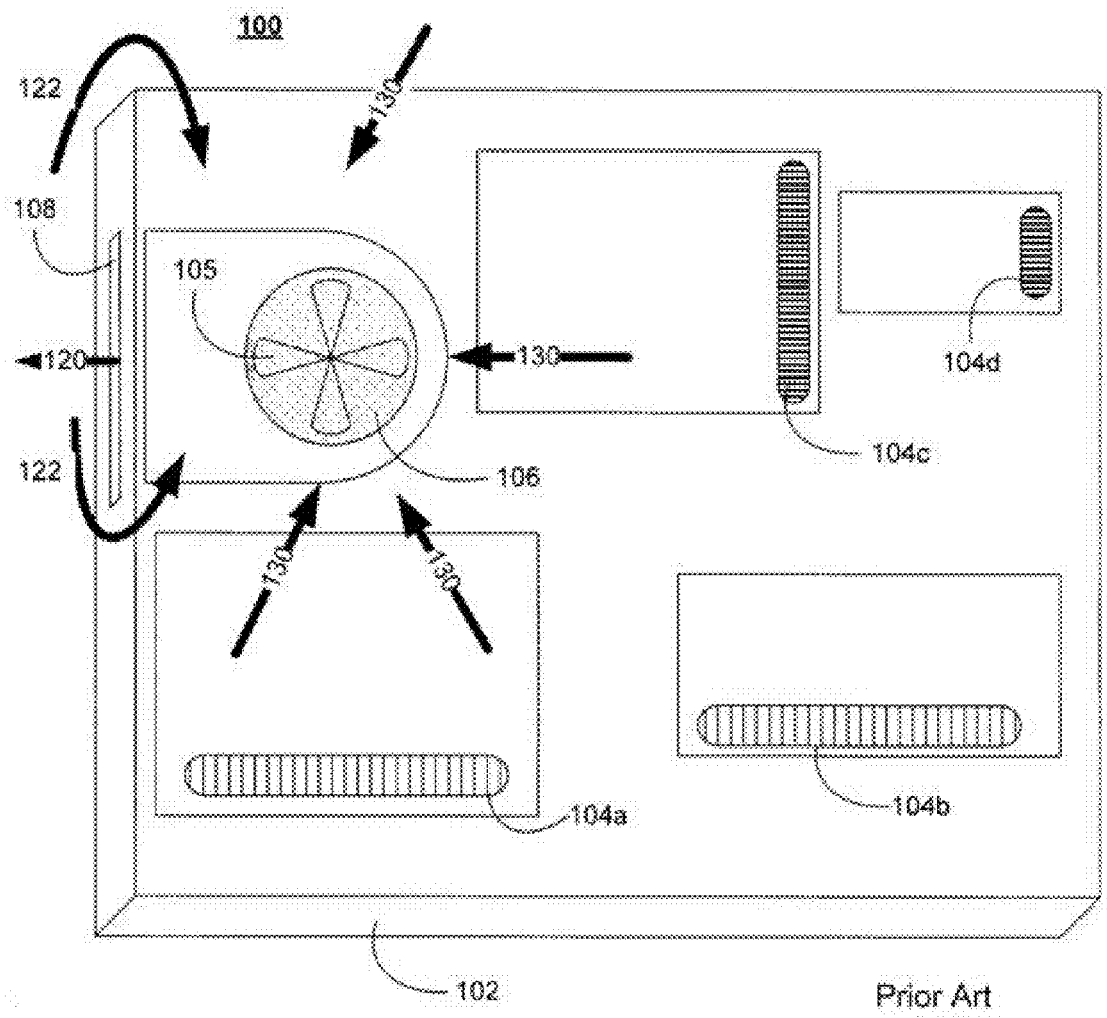
FIG. 1 is a block diagram of an apparatus with a housing but without a protrusion.

FIG. 1 is a block diagram of an apparatus with a housing 100 without a protrusion that shows exemplary airflow patterns, according to some embodiments of the invention. In FIG. 1, an apparatus is shown that includes a housing 100 with one or more external surfaces 102, each surface 102 with one or more openings 104a-104d, 106, and 108 to facilitate one or more airflows 130 and 120 into and out of the housing 100. Moreover, an air mover 105 with access to a first opening 106 to use as an inlet 106 and a second opening 108 to use as an outlet 108 is included, where the air mover 105 may be one or more of a fan, a jet, or a membrane, as one of ordinary skill in the relevant art would appreciate based at least on the teachings described herein.

In the absence of a protrusion, the airflow 120 which exhausts from the housing 100 may become airflow 122 as a result of recirculation of the air into the airflow 130. As one of ordinary skill in the relevant art would appreciate based at least on the teachings described herein, the recirculation of the air would increase the temperature of the airflow 130, and subsequently that of airflow 120, which would then feed back into the housing 100 as the airflow 122. This process would reduce the heat transfer rate in the system, and likely reduce the operability of any components in the housing 100.

Figure 2:
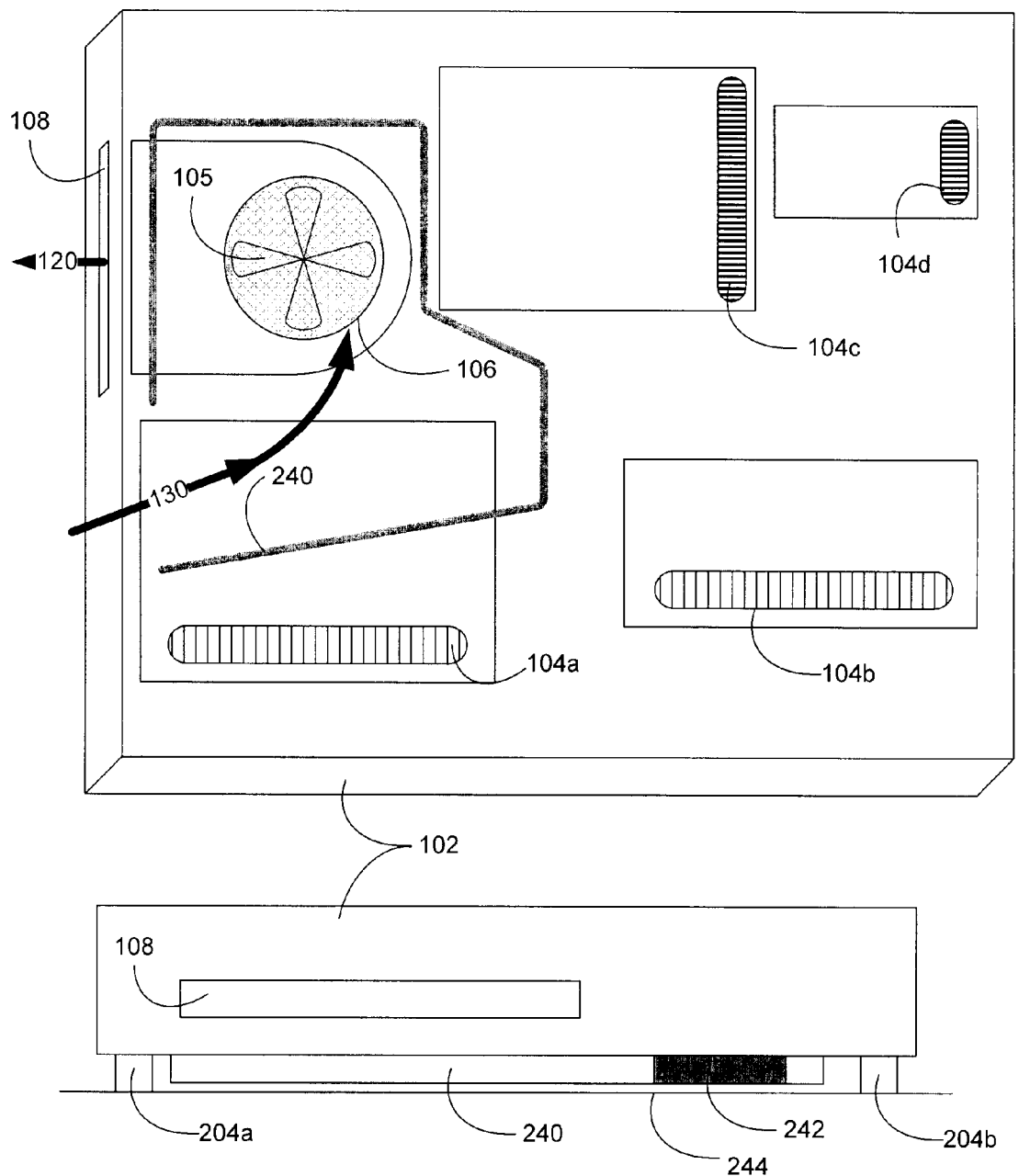
FIG. 2 is a block diagram of an apparatus with an external protrusion, according to some embodiments of the invention.

FIG. 2 is a block diagram of an apparatus with an external protrusion 240, according to some embodiments of the invention. In FIG. 2, an apparatus is shown that includes a housing 200 with one or more of the external surfaces 102, one or more the openings 104a-104d, 106, and 108, and the airflows 130 and 120 into and out of the housing 200. Moreover, the air mover 105 with access to the first opening 106 to use as an inlet 106 and the second opening 108 to use as an outlet 108 may be included.

According to some embodiments, a protrusion 240 may be extended on one or more of the surfaces 102, including, but not limited to, the top, bottom, and side surfaces 102, to channel the first airflow 130 to the inlet 106 when the protrusion 240 is substantially adjacent to an object 244 which restricts the first airflow 130 over the protrusion 240. In some embodiments, the object 244 may be a bed, a person's lap, a desk, a floor or ground, a table, etc., as one of ordinary skill in the relevant art would appreciate based at least on the teachings provided herein.

Furthermore, in some embodiments, the protrusion 240 may be configured to substantially restrict the second airflow 120 from the outlet from reaching the inlet 106. In effect, the protrusion 240 may prevent the recirculation of airflow 120 from becoming the airflow 122.

In FIG. 2, the lower portion of the figure illustrates a profile of the housing 200. In this profile, outlet 108 may be seen, as well as the protrusion 240. An opening 242 for the airflow 130 may be formed by the arrangement of the protrusion 240, according to some embodiments of the invention. Also shown, feet 204a and 204b, which may represent more than two feet or bases upon which the housing 200 may rest on the object 244. According to some embodiments, the protrusion 240, as well as the protrusions of other embodiments, such as those described elsewhere herein, may not be in direct contact with the object 244. Indeed, as illustrated in FIG. 2, the protrusion 240 may still restrict airflows when it extend about 75% of the distance between the external surface 102 and the object 244. In terms of height, the protrusions of the embodiments may be only a few millimeters in height, and the gap some fractions of a millimeter, and still restrict airflows sufficiently to prevent most recirculation.

Figure 3:
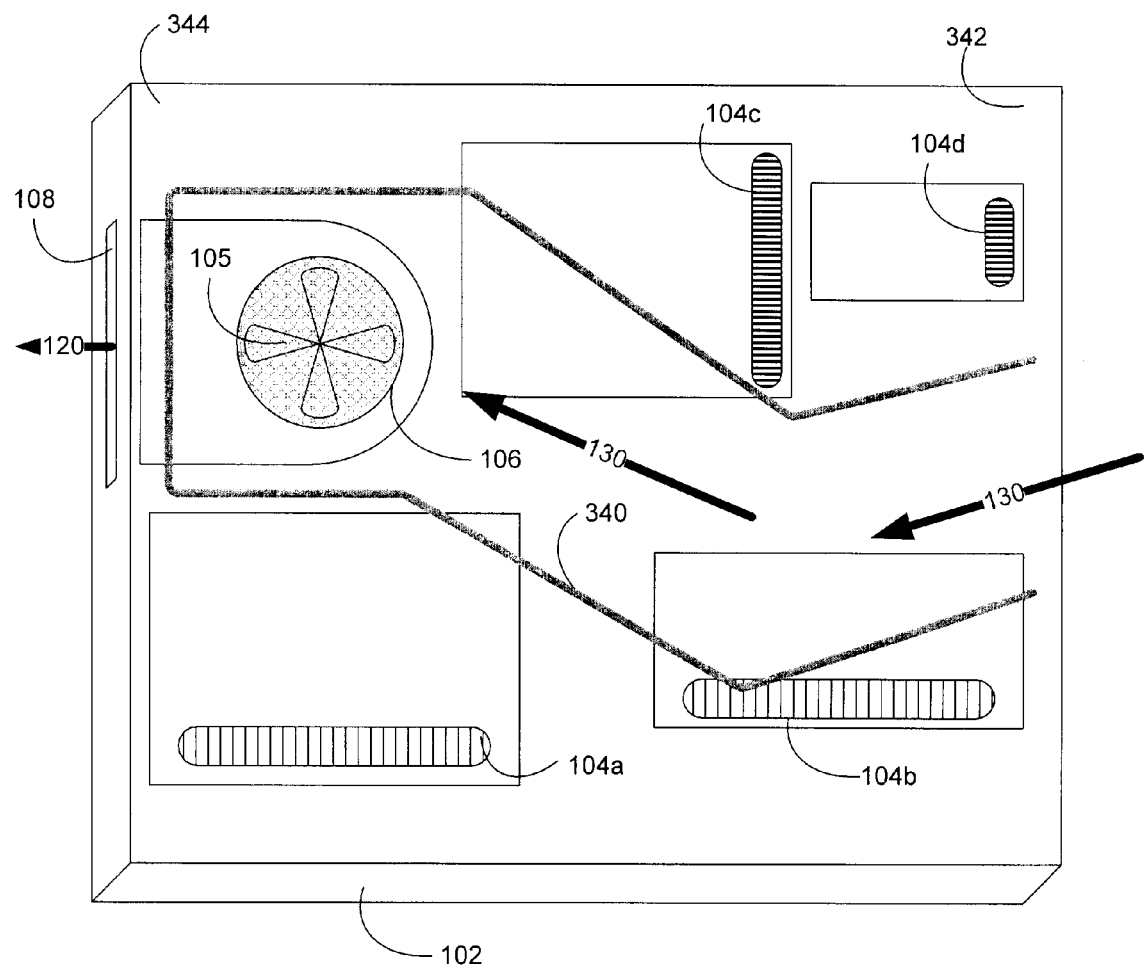
FIG. 3 is a block diagram of another apparatus with an external protrusion, according to some embodiments of the invention.

FIG. 3 is a block diagram of another apparatus using a housing 300 with an external protrusion 340, according to some embodiments of the invention. In some embodiments, the protrusion 340 may create a channel to entrain air from a first side 342 of the surface 102 other than a second side 344 of the surface 102 with the outlet 108, which may further reduce the chances of the airflow 120 circulating back into the airflow 130.

Figure 4:
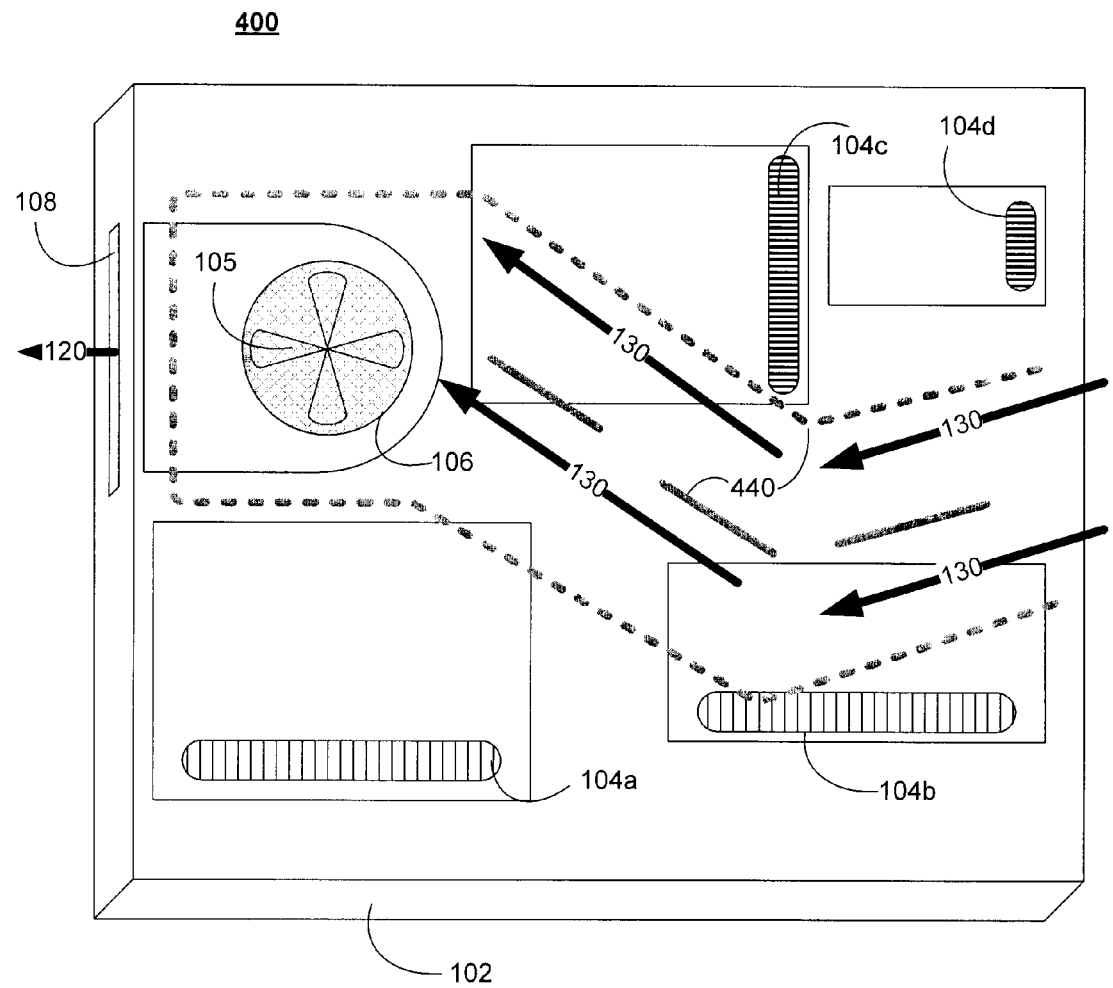
FIG. 4 is a block diagram of yet another apparatus with an external protrusion, according to some embodiments of the invention.

FIG. 4 is a block diagram of yet another apparatus using a housing 400 with an external protrusion 440, according to some embodiments of the invention. In these embodiments, the protrusion 440 may be formed from more than one discrete divider to entrain air, as illustrated. Indeed, as one of ordinary skill in the relevant art would appreciated based at least on the teachings provided herein, the use of discrete dividers may cause turbulence in the airflows, causing enough disruption to substantially restrict the airflow 120 from circulating back into the airflow 130. In some embodiments, the protrusion 440 may be formed of a single continuous divider, extension, or bump-out; or it may be formed of more than one small divider having regular or irregular lengths, rounded pegs, or other extensions.

Furthermore, as illustrated in FIG. 4, the protrusion 440 may be formed to ensure a channel or plenum for the airflow 130 when the object 244 is not substantially rigid. The use of these discrete and/or internal extensions of the protrusion 440 may ensure the object 244 does not fill the channel or plenum.

Moreover, according to some embodiments of the invention, any of the protrusions 240, 340, or 440 may be shaped in such a way that the airflow 130 may be near the same volume or have nearly the same flow rate, or at least not a substantially decreased flow rate, by leaving enough of a channel or plenum for a sufficient flow rate as established by the air mover 105.

Furthermore, the use of any of the protrusions 240, 340, or 440, of the embodiments of the invention, may provide for a reduction in the volume of the airflow 120 becoming circulated into the airflow 122. For example, in some embodiments, if about 25% of the airflow 120 is circulated back as the airflow 122, then the temperature of the airflow 130 may increase by about 10 degrees Celsius. This may cause about a 15% decrease in the effective cooling of the system.

In other embodiments, an increase in the recirculation of the airflow 122 would further decrease effective cooling, as one of ordinary skill in the relevant art would appreciate based at least on the teachings provided herein. Therefore, according to some embodiments, even a small percent reduction in recirculation of the airflow 120 as the airflow 122 may provide an improvement to the effective cooling of the system.

According to some embodiments of the invention, any of the protrusions, such as, but not limited to protrusions 240, 340, or 440 may be created from a compressible material or composition, like plastic, rubber, or other material suitable for placing into proximity or direct contact with the object 244. Furthermore, the protrusions 240, 340, or 444 may have a different thermal expansion coefficient than the housing 102.

In some embodiments of the invention, the housings 100, 200, 300, and/or 400 may be used with computer systems. Within these housings, according to some embodiments, one or more electronic components may be arranged, as one of ordinary skill in the relevant art would appreciate based at least on the teachings described herein. In some embodiments, these components may include a processor, a power supply, a memory, a hard drive, or a chipset, as well as other components or circuitry required to form an operational computer system.

Indeed, in some embodiments, a display may be included in or coupled to the housing 100, 200, 300, and/or 400. It may be likely that the highest heat generating components may be placed near the one or more openings 104, 106, and/or 108. As one of ordinary skill in the relevant art would appreciate based at least on the teachings provided herein, the processor may be positioned very near the inlet 106 and the outlet 108.

While some exemplary embodiments have been described and shown in the accompanying drawings, it is to be understood that these embodiments are illustrative and not restrictive of the invention. The invention is not restricted to specific constructions and arrangements, such as those shown and described. Modifications to the embodiments of the invention may be possible, as one of ordinary skill in the relevant art would appreciate based at least on the teachings described herein. For example, the apparatus described herein may be implemented in other than a computer system and may be used in a similar manner to provide cooling or enhanced cooling to components which generate thermal energy.

What is claimed is:

1. An apparatus, comprising:
   a housing with one or more external surfaces, each surface with one or more openings to facilitate one or more airflows into and out of the housing;
   an air mover with access to a first opening to use as an inlet and a second opening to use as an outlet; and
   a protrusion extended on one or more of the one or more surfaces to channel a first airflow to the inlet when the protrusion is substantially adjacent to an object which restricts the first airflow over the protrusion, wherein the protrusion is configured to substantially restrict a second airflow from the outlet from reaching the inlet.

2. The apparatus of claim 1, wherein the protrusion can create a channel to entrain air from a first side of the surface other than a second side of the surface with the outlet.

3. The apparatus of claim 1, wherein the protrusion is created from a compressible material.

4. The apparatus of claim 1, wherein the protrusion is formed from a continuous divider to entrain air.

5. The apparatus of claim 1, wherein the protrusion is formed from more than one discrete divider to entrain air.

6. The apparatus of claim 1, wherein the protrusion is formed to ensure a channel for the airflow when the object is not substantially rigid.

7. The apparatus of claim 1, wherein the protrusion extends at least 75% of the distance between the external surface and the object.

8. The apparatus of claim 1, wherein the air mover is a fan, a jet, or a membrane.

9. A computer system, comprising:
   a housing with one or more external surfaces, each surface with one or more openings to facilitate one or more airflows into and out of the housing;
   an air mover with access to a first opening to use as an inlet and a second opening to use as an outlet; and
   a protrusion extended on one or more of the one or more surfaces to channel a first airflow to the inlet when the protrusion is substantially adjacent to an object which restricts the first airflow over the protrusion, wherein the protrusion is configured to substantially restrict a second airflow from the outlet from reaching the inlet; and
   one or more electronic components within the housing, wherein the one or more electronic components can generate thermal energy.

10. The computer system of claim 9, wherein the protrusion can create a channel to entrain air from a first side of the surface other than a second side of the surface with the outlet.

11. The computer system of claim 9, wherein the protrusion is created from a compressible material.

12. The computer system of claim 9, wherein the protrusion is formed from a continuous divider to entrain air.

13. The computer system of claim 9, wherein the protrusion is formed from more than one discrete divider to entrain air.

14. The computer system of claim 9, wherein the protrusion is formed to ensure a channel for the airflow when the object is not substantially rigid.

15. The computer system of claim 9, wherein the protrusion extends at least 75% of the distance between the external surface and the object.

16. The computer system of claim 9, wherein the air mover is a fan, a jet, or a membrane.

17. The computer system of claim 9, wherein the one or more electronic components include a processor, a power supply, a memory, a hard drive, or a chipset.

18. The computer system of claim 9, further comprising:
    a display coupled to the housing.

* * * * *